Aug. 2, 1966
J. J. KELLY ETAL
3,264,300
2,9-DIMETHYLQUINACRIDONE IN A "YELLOW" CRYSTALLINE FORM
Filed Sept. 15, 1964
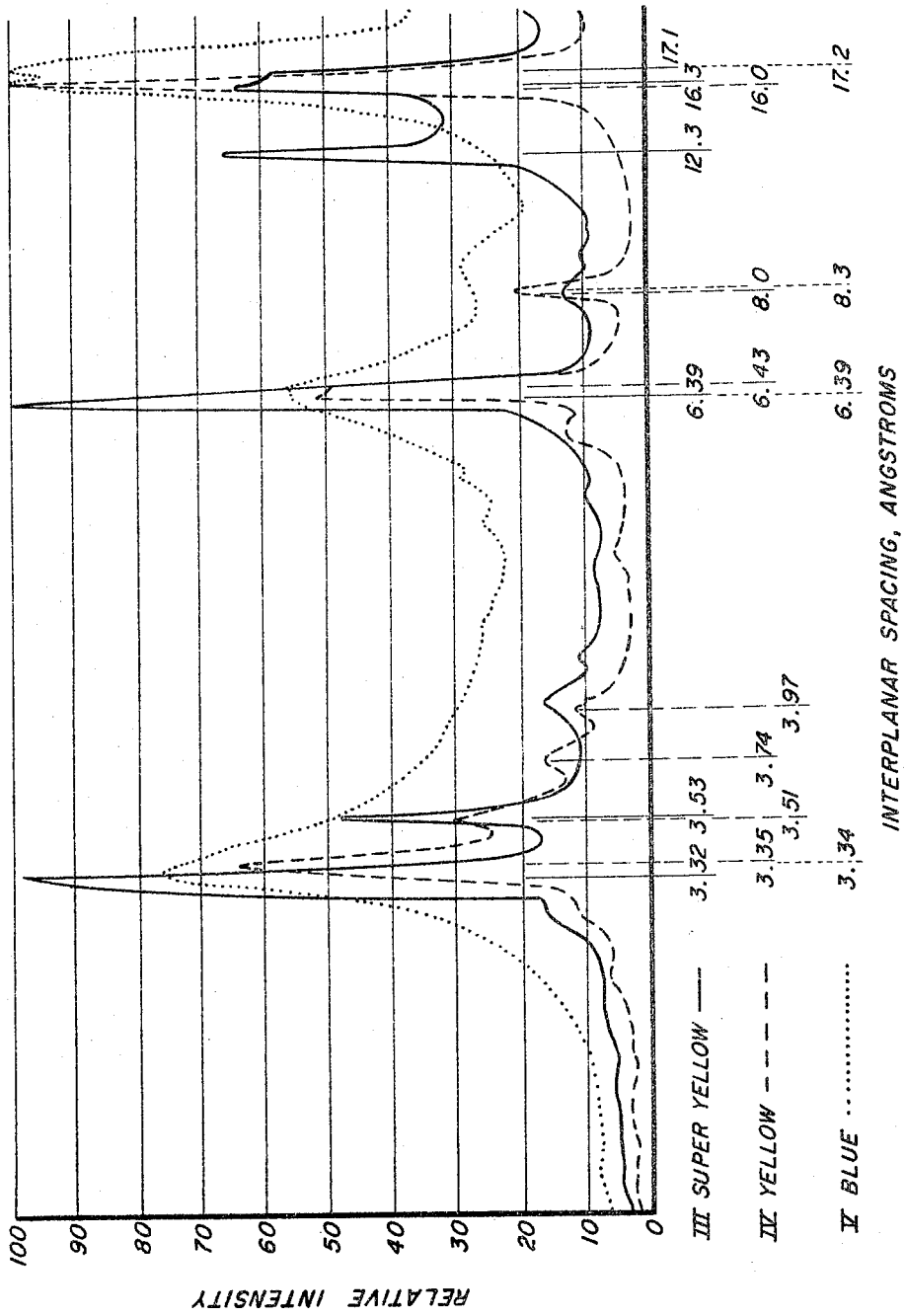
INVENTORS.
JAMES JOSEPH KELLY
VITO ALBERT GIAMBALVO
BY
*Samuel Branch Walker*
ATTORNEY

3,264,300
2,9-DIMETHYLQUINACRIDONE IN A "YELLOW" CRYSTALLINE FORM

James Joseph Kelly, Bridgewater Township, Somerset County, and Vito Albert Giambalvo, Middlesex, N.J., assignors to American Cyanamid Company, Stamford, Conn., a corporation of Maine
Filed Sept. 15, 1964, Ser. No. 396,659
8 Claims. (Cl. 260—279)

This is a continuation-in-part of application Serial No. 277,027, now abandoned.

This invention relates to the provision of a new crystalline form of linear 2,9-dimethylquinacridone.

While 2,9-dimethylquinacridone has been known as solid material in crude form, in this form it was relatively useless for pigmentary uses. When attempts were made to formulate this crude material into coating compositions, inferior and commercially unacceptable products were obtained; which were weak, hard to disperse, of dull and dirty shade, light sensitive, heat sensitive, and solvent-unstable.

The formula of 2,9-dimethylquinacridone is:

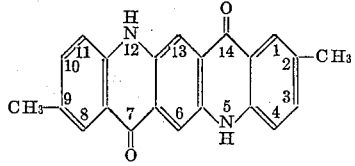

The compound could be named as 5,12-dihydro-2,9-dimethyl-quino[2,3-b] acridine-7,14-dione. The numbering system shown is based on RRI 6261, shown in the Ring Index, second edition, A. M. Patterson, J. T. Capell and D. F. Walker, American Chemical Society, Washington, D.C., 1960. Several other numbering systems have been used for the ring system shown, and other isomeric ring systems are known.

Hans Liebermann, et al., described some quinacridones in Ann. Chem. Justus Liebigs 518, 245–259 (1935) "The Formation of Quinacridone from p-Di(arylamino)terephthalic Acids Part 6. The Products of the Transformation of Succinylsuccinic Acid Ester" and others in the series. The numbering system is different so that the "2,6-dimethylquinacridone" of Liebermann corresponds in formula to the 2,9-dimethylquinacridone of applicants.

Examination of the crude synthesis product from ring closure in the presence of boric acid, as disclosed by Liebermann et al., supra, shows that this gives a crude which is not in pigmentary form. This polymorphic form has been characterized by the present inventors by the arbitrary designations as Form I and Form II as the product appears to be a mixture of these two polymorphic forms.

The product obtained in Sandoz French Patent No. 1,233,785 gives what appears to be primarily Form I.

Other prior art disclosures have given Form I, II, or V (see designation below) or mixtures thereof. These include:

Ciba, French Patent 1,226,260
British Patent 828,052
United States Patent 3,020,279
French Patent 1,255,770
French Patent 1,244,061
British Patent 884,044

As the color, strength, stability, and ease of handling are most important qualities of a pigment, not only the chemical formula but these other characteristics are critical in comparison of pigments.

In view of the potentially desirable color of 2,9-dimethylquinacridone, attempts have been made to convert the crude material to a product which could function as a valuable pigment. One such method is disclosed in copending application Serial No. 175,816, filed February 26, 1962, W. L. Berry and J. J. Kelly, and involves conditioning the crude material by ball milling with a solvent such as xylene, either with or without a pretreatment step in which the crude material was refluxed in a solvent such as dimethylformamide, a lower alkanol, dimethylsulfoxide or xylene. Two distinct crystalline forms of 2,9-dimethylquinacridone were thus prepared. The first, termed the "blue shade" red pigment, referred to herein as Form V, resulted if the crude material was not "pretreated." The second, termed the "yellow shade" red pigment, referred to herein as Form IV, was obtained if the crude material was "pretreated." Both are in pigmentary form.

A second method of obtaining the yellow shade, Form IV, is disclosed in copending application Serial No. 176,089, D. W. Thomas and W. L. Berry, filed February 27, 1962.

In a pigment the color of the pigment is a most important characteristic. Different crystal forms frequently have different colors. However, the expression of a color in numbers is difficult.

One accepted method of characterizing different crystalline forms is by X-ray powder diffraction patterns.

The accompanying drawing shows X-ray powder diffraction patterns of the polymorphic forms here described.

The solid line shows the new Super Yellow Form III. The dashed line shows the Yellow Form IV, of said Serial No. 175,816. The dotted line shows the conventional Blue Form V.

The designations by Roman numeral as to forms are arbitrary and chosen by the present inventors for purposes of convenience in description and identification. The most significant single point on the X-ray diffraction curves to distinguish the prior art forms from the present novel form designated as the "very yellow shade" or Form III, is an X-ray diffraction peak corresponding to about 12.3 Angstroms.

These forms show distinct X-ray powder diffraction patterns. The powdered crystals are irradiated with CuK alpha X-rays, and the diffracted rays measured both as to intensity and angle with a Geiger counter. The following values are obtained for the "yellow" Form IV and "blue" Form V shade pigments.

In the curves showing the forms in the drawings, instrumental error, breadth of peaks and noise to signal ratio is responsible for some minor differences in both peak location and peak width, as is well known to those skilled in the art.

In the drawings the product of the present invention is shown as Form III, a solid line, the yellow Form IV, as produced by Example 2 is shown as a dashed line, and the acid pasted product which gives Form V as used as a starting material in Example 5, is shown as a dotted line.

| Yellow Shade Form IV | | Blue Shade Form V | |
|---|---|---|---|
| Interplanar Spacings (A.) | Intensity (percent) | Interplanar Spacings (A.) | Intensity (percent) |
| 16.0 | (100) | 17.2 | (100) |
| 3.35 | 67 | 3.34 | 73 |
| 6.43 | 55 | 6.39 | 53 |
| 3.51 | 21 | 8.3 | 30 |
| 8.0 | 24 | | |
| 3.74 | 17 | | |
| 3.97 | 14 | | |

These 2,9-dimethylquinacridone polymorphs are quite stable under conditions of high temperature, particularly the yellow shade crystalline Form IV, and additionally show stability in the presence of solvents.

It has now been discovered that a new polymorph of 2,9-dimethylquinacridone, here called Form III, can be obtained by subjecting 2,9-dimethylquinacridone as a crude or pigment of various shades, including Form I, the yellow shade of Form IV and blue shade Form V, and mixtures thereof, to our novel conversion process. The conversion process of this invention involves grinding the previously known 2,9-dimethylquinacridone in an extreme shear grinding device, in the presence of a specific quantity of a liquid grinding vehicle, micro-atomized salt and, if desired, extra-fine flake salt, and at an elevated temperature.

The grinding device must be capable of producing extreme shear conditions. Suitable for this purpose is a dough mixer. A Werner-Pfleiderer mixer gives good results. If conversion is attempted with a ball mill, the result is merely the expected decrease in pigment particle size, without change in polymorphic structure.

Suitable as the liquid vehicles are glycols, including ethylene glycol, diethylene glycol, polyethylene glycol to a molecular weight of approximately 600 (even higher water soluble polyethylene glycols may be used if the temperature is high enough to keep them liquid), and ethanolamines, including ethanolamine, diethanolamine and triethanolamine and the hydroxyethyl ethers thereof.

Particularly suitable as the liquid grinding vehicles are polyethylene glycols of a molecular weight up to about 400. It is important that sufficient vehicle be present to allow a wet paste to form. Results are not satisfactory when too little vehicle is employed and the pigment charge is only a discontinuous aggregate of discrete masses. In order to assure the desired continuity of liquid within the pigment charge, generally about 0.5 to 2 parts of vehicle per part by weight of pigment, should be employed. It is preferred that about 1.0 parts by weight of the vehicle be used.

To effect the desired conversion, the grinding step must be conducted in the presence of salt as the grinding medium. Ordinary salt is too coarse to be of practical use for this purpose. In practice, micro-atomized salt must be used as a grinding aid. This is NaCl in an extremely pulverized state, with a surface area not less than 0.75 square meters/gram; 0.1% moisture is the usual commerical grade. Too much moisture may cause caking. Extra fine flake, may replace some, but not all of the micro-atomized salt in the charge to the grinding device and yet permit practical attainment of the desired polymorph. A sample of such salt has the following typical particle size distribution:

*Extra fine flake salt*

| Particle size on: | Percent |
|---|---|
| 50 mesh | 0.1 |
| 70 mesh | 1.6 |
| 80 mesh | 16.3 |
| 100 mesh | 19.9 |
| 150 mesh | 23.7 |
| 200 mesh | 16.0 | through 200 mesh

From about 2.25 to 15.00 parts of salt as described above should be employed per part by weight of pigment. Of this, at least one part must be micro-atomized. However, a mixture of micro-atomized and extra-fine flake salt may be employed, and is preferred. Thus, for each weight part of starting pigment, about three to four parts of a mixture containing about one to two parts of the micro-atomized salt, the balance being extra-fine flake salt, is preferred.

For the most economical and rapid conversion, the right grades and quantities of salt are required. More or less salt, and coarser salt gives the preferred product, but a longer grinding cycle is required.

Temperature during grinding should be maintained in the range of about 30° to 125° C. and, preferably 70° to 100° C. If the temperture is too high, i.e., above about 125° C., the process is made impractical as a result of product degradation. On the other hand, if the temperature is too low, i.e., lower than room temperature, the desired conversion is undesirably slow.

When the foregoing requirements are satisfied in making up the charge to the grinding tool and the pigment paste is ground for about 10 to 25 hours, the original pigment is converted to the new polymorph of this invention. It is quite surprising that even the previously known yellow shade (Form IV) is converted to a new polymorph by the described method since, as disclosed in the above-noted copending application, the yellow shade polymorph (Form IV) is quite stable.

Although conversion to the new form may be effected completely if the grinding process is continued sufficiently long, useful pigment products of varying yellow shades are also obtained if the grinding process for conversion is not carried out for a long enough period to achieve complete change. Thus, these products which are only partially converted to the new yellow shade are also useful in that by such means, particularly desired intermediate yellow shades of the red pigment are obtained. The mixing can also occur after production by using a ratio of forms such as to mix to a preferred color.

The new polymorph may be isolated by washing with water to remove salt and glycol and drying at a temperature between 25° and 100° C.

The new pigment is characterized by a much yellower shade of red than previously known for 2,9-dimethylquinacridone pigments. For purposes of description, it is designated the "super yellow" shade of 2,9-dimethylquinacridone, or Form III. It has excellent hiding, dispersing, tinctorial and light fastness properties and provides a very desirable yellow-red shade of pigment. It, or blends of it with other 2,9-dimethylquinacridone pigments, or other types of pigments, can be used in conventional paint formulations and as a colorant for plastics such as polyvinylchlorides and polystyrenes.

The new super yellow Form III can be distinguished from known polymorphs by its X-ray diffraction pattern, as well as by its other characteristics. It shows a new and prominent peak at about 12.3 A. which is unique for this polymorph, and readily used for identification, with a general X-ray pattern featuring in addition, two peaks of relatively strong intensity at 3.32 and 6.39 A. and three peaks of relatively moderate intensity at 17.1, 16.3 and 3.53 A. The peak of prominent but moderate intensity at about 12.3 A. is, as stated above, unique for this polymorphic Form III of 2,9-dimethylquinacridone; products made by various other chemical or conditioning processes do not show the peak at 12.3 A. and the super yellow shade of Form III may be easily identified in this way.

The importance of the color change with the change in polymorphic form of 2,9-dimethylquinacridone can be seen from the following table:

| Form of 2,9-DMQ: | Dominant wavelength in millimicrons |
|---|---|
| Blue Shade Form V | 524 C |
| Yellow Shade Form IV | 513 C |
| Super Yellow Form III (this invention) | 503 C |

These were determined on inks tinted in a conventional manner with zinc oxide to light shades.

All are red pigments, tending towards magenta. The shade difference is critical in use. The dominant wavelength can be determined from spectrophotometric reflectance curves, of samples, by procedures such as described in A. C. Hardy, "Handbook of Colorimetry," Technology Press, Cambridge, Mass., 1936. Greatly simplified, ordinarily, the dominant wavelength of a color is the wavelength of that pure spectral light, which when mixed with white light will give the color. It corresponds to the psychological concept of hue. For some cases the calculations lead to a complementary color, such as here, where the designation of "C" so indicates.

As intermediate colors may be of interest, obviously mixtures of the present novel super yellow Form III and either yellow Form IV and blue Form V may be used to attain a selected variation. The mixture may be accomplished either by mixing the pure pigment, crystal forms, or by incomplete conversion to the new super yellow form of one or more of the other forms.

The new super yellow form can be converted by acid pasting to the old blue shade V, which unequivocally establishes that the change in color does not result from change in the chemical composition.

The designations I, II, III, IV and V are arbitrary.

The following examples are presented to further illustrate this invention. All parts are by weight unless otherwise specified.

Example 1

To a one-quart size dough mixer were charged 50 g. of acid pasted 2,9-dimethylquinacridone (Form V), 50 g. extra-fine flake salt, 250 g. micro-atomized salt and 50 ml. polyethylene glycol (approximately average molecular weight, 300). The mix was kneaded for a period of 19 hours, heating the mixer with steam passing through the jacket; during this time, the mix was adjusted with an additional 50 g. micro-atomized salt and 1.3 ml. of polyethylene glycol of the type used above.

During the last half hour of the grind, 1.0 g. each of lauryl and cetyl alcohol were added. The mix was discharged into 3 l. of water containing 150 g. xylene sulfonic acid (for conditioning purposes). The slurry was held at 90 to 95° C. for about one hour and the pigment then isolated by filtration and washed.

The product pigment is essentially completely converted to the "super yellow" Form III, as measured by X-ray diffraction data. The product pigment is light-fast, bleed-resistant, heat-stable and a clear bright yellowish shade of red, as compared with acid-pasted 2,9-dimethylquinacridone. It is suitable for lithographic printing inks, rotographic printing inks, flexographic printing inks, letterpress printing inks, automotive enamels, automotive lacquers, latex paints, plastics such as polyvinyl, polystyrene, cellulose acetate, nitrocellulose, polymethacrylate and other uses for which stable organic pigments are desired.

Example 2

To 291 g. of the mixed methyl ethyl ester of 2,5-di-p-toluidinoterephthalate is added 2180 ml. of 1,2,4-trichlorobenzene. The mixture is heated to 205° C. and 145 g. of p-toluene sulfonic acid is added very slowly. The mixture is then heated with stirring for three hours at about 213° C. The solid which forms is removed by hot filtration and washed with hot trichlorobenzene. After a further washing with hot dimethylformamide, substantially pure pigment product (Form IV) is obtained in 73.3% yield.

Washing with hot ethanol instead of dimethylformamide also gives a yield of about the same quality and quantity.

Example 3

To a 15 gallon size dough mixer are charged 17.35 lbs. of crude 2,9-dimethylquinacridone, obtained as in Example 2 (which is taken from Example 1 of copending application Serial No. 176,089), 18 lbs. of micro-atomized salt and 18 lbs. of extra-fine flake salt. The mix is kneaded until a uniform dry mix results and then 12 lbs. of ethylene glycol is added. The total mix is then kneaded until a well-wet paste results; then additional extra-fine flake salt is added until a good workable grinding paste results (14 to 22 lbs. more extra-fine flake salt). The mixture is then kneaded in the mixer for about 10 hours at 35 to 45° C.

The kneaded paste is then removed from the dough mixer and to it is added in a mixing kettle, 1000 lbs. of water. After stirring until a uniform slurry results, 51 lbs. of xylene sulfonic acid and 18 lbs. of xylene are added. The mixture is then heated with stirring at 80° to 85° C. for about one hour, to complete flushing. The xylene is removed by steam distillation, the stripped slurry is cooled to 65° C. and the pigment is then isolated by filtration. After washing with water, the pigment is dried at 150 to 170° C. and then ground in a pulverizing mill.

The "super yellow" polymorph, Form III, of 2,9-dimethylquinacridone results.

Example 4

A mixture of 16 lbs. of 2,9-dimethylquinacridone prepared as in Example 2, 18 lbs. of micro-atomized salt, 36 lbs. of extra-fine flake salt and 12 lbs. of ethylene glycol is charged to a dough mixer and kneaded until a high consistency homogeneous paste results. This mixture is then ground in the dough mixer for about 20 hours at which time conversion to the "super yellow" shade is substantially complete. The pigment is isolated by treating 36 grams of the paste with 360 ml. of water containing 26 grams of xylene sulfonic acid and 9 grams of xylene. After mixing at 90° C. for about one hour, the xylene is removed by steam distillation and the pigment solids isolated by filtration, washed with water and dried at 65 to 75° C.

The rate of conversion to the "super yellow" form can be measured by following the intensity of the 12.3 A. peak in the X-ray diffraction pattern, which is a relative value, discounting the background noise of the instrument, and the starting height. Results obtained were:

| Grinding time in hours: | Relative 12.3 A. peak height |
|---|---|
| 0 | 0 |
| 6 | 6.4 |
| 16 | 16.0 |
| 20 | 17.5 |

It can be seen that by stopping the grinding at intermediate states, a smaller relative conversion to the new "super yellow" shade can be obtained if intermediate color values are desired.

The same product is obtained when polyethylene glycol with a molecular weight of 300 is substituted for the glycol used in the procedure of Example 3.

Example 5

The starting material here is the pigment obtained by acid pasting the product of Example 2 and hence is in Form V. A mixture of 40 grams of the resulting dry pigment, 100 grams of micro-atomized salt, 200 grams of extra-fine flake salt and 50 ml. of ethylene glycol is kneaded in a dough mixer until a uniform paste results. The grinding is then continued at a temperature of about 40 to 50° C. for a total of about 32 hours, adding additional micro-atomized salt and ethylene glycol in small amounts to maintain an easily grindable consistency. The mixture is then isolated and treated in water with xylene sulfonic acid and xylene, as described in Examples 3 and 4, to obtain the "super yellow" pigment.

We claim:

1. The crystalline polymorph of 2,9-dimethylquinacridone characterized by a "very yellow shade" of red color designated Form III and having in its X-ray diffraction pattern a distinctive moderate peak corresponding to an interplanar spacing of about 12.3 A.

2. The crystalline polymorph of 2,9-dimethylquinacridone characterized by a "very yellow" shade of red color designated Form III and having in its X-ray diffraction pattern two peaks of relatively strong intensity at about 3.32 and about 6.39 A. and four peaks of relatively moderate intensity at about 17.1, 16.3, 12.3 and 3.53 A.

3. The method of preparing the crystalline polymorph of 2,9-dimethylquinacridone defined in claim 2, which comprises grinding a mixture of (a) one part of a 2,9-dimethylquinacridone in other polymorphic form; (b) 2.25 to 15.00 parts of a grinding aid consisting of at least one part by weight of micro-atomized salt, the remainder of said grinding aid being extra-fine flake salt; and (c) about 0.50 to 2 parts by weight of a glycol liquid at the grinding temperature having a molecular weight not higher than about 600;

said grinding being conducted for 10 to 25 hours at a temperature of 30° to 125° C. in a device capable of producing high shear conditions;

and isolating the crystalline Form III polymorph thus formed.

4. The method of claim 3 wherein the glycol is ethylene glycol.

5. The method of claim 3 wherein the glycol is polyethylene glycol having a molecular weight of about 300.

6. The method of claim 3 wherein the grinding aid is a mixture of about 4 parts of micro-atomized salt and about 8 parts of extra-fine flake salt.

7. A "very yellow shade" of red 2,9-dimethylquinacridone pigment consisting of individual pigmentary size particles of 2,9-dimethylquinacridone, the individual particles having such crystalline characteristics that they are characterized by a "very yellow shade" of red color designated Form III; and having in its X-ray diffraction pattern a distinctive moderate peak corresponding to an interplanar spacing of about 12.3 A.

8. A "very yellow shade" of red 2,9-dimethylquinacridone pigment consisting of individual pigmentary size particles of 2,9-dimethylquinacridone, the individual particles having such crystalline characteristics that they are characterized by a "very yellow" shade of red color designated Form III; and having in its X-ray diffraction pattern two peaks of relatively strong intensity at about 3.32 and about 6.39 A. and four peaks of relatively moderate intensity at about 17.1, 16.3, 12.3 and 3.53 A.

References Cited by the Examiner

UNITED STATES PATENTS

| | | | |
|---|---|---|---|
| 2,982,666 | 5/1961 | Chun | 260—279 |
| 3,020,279 | 2/1962 | Woodlock | 260—279 |
| 3,030,370 | 4/1962 | Jackson | 260—277 |

FOREIGN PATENTS

| | | |
|---|---|---|
| 828,052 | 2/1960 | Great Britain. |
| 1,226,260 | 2/1960 | France. |
| 1,255,770 | 1/1961 | France. |

ALEX MAZEL, *Primary Examiner.*

DONALD G. DAUS, *Assistant Examiner.*